(12) United States Patent
Li et al.

(10) Patent No.: US 11,252,594 B2
(45) Date of Patent: Feb. 15, 2022

(54) ADJUSTMENT METHOD, TERMINAL, AND NETWORK DEVICE

(71) Applicant: HUAWEI TECHNOLOGIES CO., LTD., Guangdong (CN)

(72) Inventors: Bingzhao Li, Beijing (CN); Zhenzhen Cao, Beijing (CN); Xuelong Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 87 days.

(21) Appl. No.: 16/712,292

(22) Filed: Dec. 12, 2019

(65) Prior Publication Data

US 2020/0120533 A1    Apr. 16, 2020

Related U.S. Application Data

(63) Continuation of application No. PCT/CN2018/091094, filed on Jun. 13, 2018.

(30) Foreign Application Priority Data

Jun. 16, 2017    (CN) .......................... 201710458437.3

(51) Int. Cl.
*H04W 28/02* (2009.01)
*H04W 76/11* (2018.01)
*H04W 36/00* (2009.01)
*H04W 28/06* (2009.01)
*H04W 36/08* (2009.01)

(52) U.S. Cl.
CPC ....... *H04W 28/0226* (2013.01); *H04W 28/06* (2013.01); *H04W 36/00835* (2018.08); *H04W 36/08* (2013.01); *H04W 76/11* (2018.02)

(58) Field of Classification Search
CPC ............. H04W 28/0226; H04W 76/11; H04W 36/00835; H04W 28/06; H04W 36/08
See application file for complete search history.

(56) References Cited

U.S. PATENT DOCUMENTS

| | | | |
|---|---|---|---|
| 2015/0230141 A1 | 8/2015 | Zou et al. | |
| 2017/0055188 A1 | 2/2017 | Johansson et al. | |

FOREIGN PATENT DOCUMENTS

| | | |
|---|---|---|
| CN | 101361389 A | 2/2009 |
| CN | 105993191 A | 10/2016 |
| CN | 107113680 A | 8/2017 |
| CN | 104145503 B | 11/2017 |

OTHER PUBLICATIONS

Huawei et al., "Support of Redistribution priority in NR", 3GPP TSG-RAN WG2 NR AdHoc # 2 R2-1706739, Jun. 17, 2017, total 2 pages.

(Continued)

*Primary Examiner* — Chi H Pham
*Assistant Examiner* — Ji-Hae Yea
(74) *Attorney, Agent, or Firm* — Westerman, Hattori, Daniels & Adrian, LLP

(57) ABSTRACT

An adjustment method includes receiving, by a terminal, a redistribution command sent by a network device, where the redistribution command is used to adjust a frequency priority or a cell priority of a terminal in a cell; and ignoring, by the terminal, the redistribution command based on a status of the terminal. Network signaling overheads can be reduced in a process in which a network side instructs to perform redistribution.

20 Claims, 8 Drawing Sheets

(56) References Cited

OTHER PUBLICATIONS

Huawei et al., "Support of Redistribution priority in NR", 3GPP TSG-RAN WG2 Meeting # 98 R2-1704886, May 6, 2017, total 2 pages.
3GPP TS 36.331 V14.2.2 (Apr. 2017);3rd Generation Partnership Project;Technical Specification Group Radio Access Network;Evolved Universal Terrestrial Radio Access (E-UTRA);Radio Resouice Control (RRC);Protocol specification (Release 14);total 721 pages.
International Search Report dated Aug. 21, 2018, issued in counterpart Application No. PCT/CN2018/091094, with English translation. (11 pages).
Extended (Supplementary) European Search Report dated Apr. 9, 2020, issued in counterpart application No. 18818189.5. (13 pages).
3GPP TS 36.304 V14.2.0 (Mar. 2017), 3rd Generation Partnership Project; Technical Specification Group Radio Access Network; Evolved Universal Terrestrial Radio Access (EUTRA); User Equipment (UE) procedures in idle mode (Release 14). (50 pages).
Tri, "Discussion on the lightly connected UE's behaviour", 3GPP TSG RAN WG2 #96, R2-168081, Reno, USA, Nov. 14-18, 2016. (4 pages).
LG Electronics Inc.,"Cell reselection in Inactive state", Cell reselection in Inactive state, R2-1703600, Spokane, USA, Apr. 3-7, 2017. (2 pages).
Ericsson, "Connected to Inactive state transition", 3GPP TSG-RAN WG2 #98, Tdoc R2-1704119, Hangzhou, P.R. of China, May 15-19, 2017, (8 pages).
Ericsson, "Camping in NR", 3GPP TSG-RAN WG2#98, Tdoc R2-1704362, Hangzhou, P.R. of China, May 15-19, 2017. (4 pages).
Samsung,"Use of priorities with idle load balancing re-distribution",3GPP TSG-RAN2#92 meeting Tdoc R2-156213, Anaheim, USA, Nov. 16-20, 2015,total 2 pages.
Kyocera,"Discussion on ambiguity after timer T360 expiry",3GPP TSG-RAN WG2 #94 R2-163727,Nanjing, China, May 23 27, 2016,total 4 pages.
Office Action dated Jun. 29, 2020, issued in counterpart CN Application No. 201710458437.3, with English Translation. (13 pages).

ADJUSTMENT METHOD, TERMINAL, AND NETWORK DEVICE

CROSS-REFERENCE TO RELATED APPLICATIONS

This application is a continuation of International Application No. PCT/CN2018/091094, filed on Jun. 13, 2018, which claims priority to Chinese Patent Application No. 201710458437.3, filed on Jun. 16, 2017, The disclosures of the aforementioned applications are hereby incorporated by reference in their entireties.

TECHNICAL FIELD

Embodiments of this application relate to communications technologies, and in particular, to an adjustment method, a terminal, and a network device.

BACKGROUND

Mobility management is a process in which user equipment (UE) reports a location to a network side, provides a UE identifier for the network side, and maintains a physical channel. Based on a connection status of radio resource control (RRC), the mobility management may be classified into mobility management in a connected state and mobility management in an idle state. The mobility management in the connected state specifically means that the UE performs cell handover under the control of a radio access network (RAN). The mobility management in the idle state specifically means that the UE performs cell-based reselection.

In a process in which the UE performs cell-based reselection, an idle UE selects, based on cell reselection, a frequency and a cell for camping. When a plurality of frequencies are deployed in the radio access network, UEs are unevenly distributed on different frequencies. Consequently, a load on some frequencies is relatively high, and a load on some frequencies is relatively low. To balance the load on all frequencies, an idle UE redistribution technology is introduced in long term evolution (LTE). A base station may send a redistribution command to an UE by using a broadcast message and/or a paging message. A network device may notify, by using the broadcast message and/or the paging message, the UE of a redistributed frequency and a redistribution factor corresponding to each frequency. After receiving the redistribution command, the UE calculates, based on a UE ID, a redistribution factor corresponding to the UE, sets a priority of a frequency or a cell that corresponds to the redistribution factor to a highest priority, and performs cell reselection based on the priority. For example, a redistribution factor corresponding to a frequency 1 is 10, a redistribution factor corresponding to a frequency 2 is 20, and a redistribution factor corresponding to a frequency 3 is 30. If UE ID mod 100=5, and 5 falls into a range of 0 to 10, the UE sets a priority of the frequency 1 to a highest priority. If UE ID mod 100=25, and 25 falls into a range of 20 to 30, the UE sets a priority of the frequency 3 to a highest priority.

With continuous development of wireless communications technologies, an inactive state is proposed. The inactive state is another state different from the connected state and the idle state. When a terminal is in the inactive state, the terminal stores context information of the terminal and information about a connection to a core network, and further stores location management area information configured by an anchor RAN device. The location management area information corresponds to a location management area. When moving in the location management area, the terminal does not need to notify the anchor RAN device of the event. When exceeding the location management area, the terminal needs to notify the anchor RAN device of the event by using a message. It can be learned that when a network needs to perform batch redistribution, network signaling overheads are relatively large.

SUMMARY

Embodiments of this application provide an adjustment method, a terminal, and a network device, to resolve a problem that network signaling overheads are relatively large when a network needs to perform batch redistribution.

According to a first aspect, an embodiment of this application provides an adjustment method, including:

receiving, by a terminal, a redistribution command sent by a network device, where the redistribution command is used to adjust a frequency priority or a cell priority of a terminal in a cell; and ignoring, by the terminal, the redistribution command based on a status of the terminal.

In this implementation, the terminal receives the redistribution command sent by the network device, and the terminal ignores the redistribution command based on the status of the terminal. After the terminal ignores the redistribution command, the following case does not occur: The terminal moves out of a location management area by executing the redistribution command, and notifies a network side of the event by using a signaling message. In this way, network signaling overheads are reduced in a process in which the network side instructs to perform redistribution.

With reference to the first aspect, in a possible implementation of the first aspect, the ignoring, by the terminal, the redistribution command based on a status of the terminal includes: when the terminal is in an inactive state, and the terminal receives indication information sent by the network device, ignoring, by the terminal, the redistribution command.

In this implementation, when the terminal is in the inactive state, and the terminal receives the indication information sent by the network device, the terminal ignores the received redistribution instruction based on the indication information. In this way, network signaling overheads are reduced in the process in which the network side instructs to perform redistribution.

With reference to the first aspect or the possible implementation of the first aspect, in another possible implementation of the first aspect, receiving, by the terminal, the indication information sent by the network device includes: before receiving the redistribution command, receiving, by the terminal, the indication information from an anchor network device of the terminal; or receiving, by the terminal, the indication information from a message including the redistribution command.

With reference to the first aspect or any possible implementation of the first aspect, in another possible implementation of the first aspect, the ignoring, by the terminal, the redistribution command based on a status of the terminal includes: when the terminal is in the inactive state, ignoring, by the terminal, the redistribution command based on location management area information of the terminal.

In this implementation, when the terminal is in the inactive state, the terminal may ignore the redistribution command based on the location management area information of the terminal. In this way, network signaling overheads are reduced in the process in which the network side instructs to perform redistribution.

With reference to the first aspect or any possible implementation of the first aspect, in another possible implementation of the first aspect, the location management area information includes a cell list or a management area identifier, and the ignoring, by the terminal, the redistribution command based on location management area information of the terminal includes: determining, by the terminal, a size of a location management area of the terminal based on the location management area information of the terminal; and ignoring, by the terminal, the redistribution command based on the size of the location management area of the terminal.

In this implementation, when the terminal is in the inactive state, the terminal may ignore the redistribution command based on the size of the location management area of the terminal. In this way, network signaling overheads are reduced in the process in which the network side instructs to perform redistribution.

With reference to the first aspect or any possible implementation of the first aspect, in another possible implementation of the first aspect, the ignoring, by the terminal, the redistribution command based on the size of the location management area of the terminal includes: ignoring, by the terminal, the redistribution command if the location management area of the terminal includes one cell.

In this implementation, the terminal may ignore the received redistribution command when the terminal is in the inactive state and the location management area of the terminal includes one cell. In this way, network signaling overheads are reduced in the process in which the network side instructs to perform redistribution.

With reference to the first aspect or any possible implementation of the first aspect, in another possible implementation of the first aspect, the ignoring, by the terminal, the redistribution command based on location management area information of the terminal includes: ignoring, by the terminal, the redistribution command if the terminal determines, based on the location management area information of the terminal, that a reselected cell exceeds a location management area corresponding to the location management area information after the terminal performs cell reselection by applying the redistribution command; or ignoring, by the terminal, the redistribution command if the terminal determines, based on the location management area information of the terminal, that a reselected frequency exceeds a frequency range corresponding to the location management area information after the terminal performs cell reselection by applying the redistribution command.

According to a second aspect, an embodiment of this application provides an adjustment method, including:

generating, by a network device, indication information; and sending, by the network device, the indication information to a terminal, where the indication information is used to instruct the terminal to ignore a redistribution command if the terminal receives the redistribution command in an inactive state.

In this implementation, the network device sends the indication information to the terminal, and the terminal ignores the redistribution command based on the indication information. In this way, network signaling overheads are reduced in a process in which a network side instructs to perform redistribution.

With reference to the second aspect, in a possible implementation of the second aspect, the sending, by the network device, the indication information to a terminal includes: sending, by the network device, a redistribution command to the terminal, where the redistribution command carries the indication information; or sending, by the network device, a status control command to the terminal, where the status control command carries the indication information, and the status control command is used to instruct the terminal to enter the inactive state.

In this implementation, the network device may send the indication information to the terminal by using the redistribution command or the status control command, thereby further reducing signaling overheads.

With reference to the second aspect or the possible implementation of the second aspect, in another possible implementation of the second aspect, the generating, by a network device, indication information includes: determining, by the network device, a size of a location management area of the terminal based on location management area information of the terminal; and generating, by the network device, the indication information based on the size of the location management area of the terminal, where the location management area information includes a cell list or a management area identifier.

In this implementation, the network device generates the indication information based on the location management area information of the terminal, and sends the indication information to the terminal, and the terminal ignores the redistribution command based on the indication information. In this way, network signaling overheads are reduced in the process in which the network side instructs to perform redistribution.

With reference to the second aspect or the possible implementation of the second aspect, in another possible implementation of the second aspect, the generating, by the network device, the indication information based on the size of the location management area of the terminal includes: generating, by the network device, the indication information of the terminal if the location management area of the terminal includes one cell.

According to a third aspect, an embodiment of this application provides a terminal. The terminal has a function of implementing behavior of the terminal in the foregoing method embodiments. The function may be implemented by hardware, or may be implemented by hardware by executing corresponding software. The hardware or software includes one or more modules corresponding to the function.

According to a fourth aspect, an embodiment of this application provides a terminal, including a processor, a memory, and a communications interface. The memory is configured to store a computer executable instruction. When the terminal runs, the processor executes the computer executable instruction stored in the memory, to enable the terminal to perform the adjustment method according to any possible implementation of the first aspect.

According to a fifth aspect, an embodiment of this application provides a computer readable storage medium, configured to store a computer software instruction used by the foregoing terminal. When the computer software instruction is run on a computer, the computer is enabled to perform the adjustment method according to any possible implementation of the first aspect.

According to a sixth aspect, an embodiment of this application provides a computer program product that includes an instruction. When the computer program product is run on a computer, the computer is enabled to perform the adjustment method according to any possible implementation of the first aspect.

In addition, for technical effects brought by any design manner in the third aspect to the sixth aspect, refer to the technical effects brought by different design manners in the first aspect. Details are not described herein again.

According to a seventh aspect, an embodiment of this application provides a network device. The network device has a function of implementing behavior of the network device in the foregoing method embodiments. The function may be implemented by hardware, or may be implemented by hardware by executing corresponding software. The hardware or software includes one or more modules corresponding to the function.

According to an eighth aspect, an embodiment of this application provides a network device, including a processor, a memory, and a communications interface. The memory is configured to store a computer executable instruction. When the network device runs, the processor executes the computer executable instruction stored in the memory, to enable the network device to perform the adjustment method according to any possible implementation of the second aspect.

According to a ninth aspect, an embodiment of this application provides a computer readable storage medium, configured to store a computer software instruction used by the foregoing network device. When the computer software instruction is run on a computer, the computer is enabled to perform the adjustment method according to any possible implementation of the second aspect.

According to a tenth aspect, an embodiment of this application provides a computer program product that includes an instruction. When the computer program product is run on a computer, the computer is enabled to perform the adjustment method according to any possible implementation of the second aspect.

In addition, for technical effects brought by any design manner in the seventh aspect to the tenth aspect, refer to the technical effects brought by different design manners in the second aspect. Details are not described herein again.

According to an eleventh aspect, an embodiment of this application provides a chip for running an instruction, and the chip is configured to perform the following steps:

ignoring a redistribution command based on a status of a terminal, where the redistribution command is from a network device, and the redistribution command is used to adjust a frequency priority or a cell priority of a terminal in a cell.

For technical effects brought by the eleventh aspect, refer to the technical effects brought by different design manners in the first aspect. Details are not described herein again.

According to the adjustment method, the terminal, and the network device in the embodiments of this application, the terminal receives the redistribution command sent by the network device, and the terminal ignores the redistribution command based on the status of the terminal. After the terminal ignores the redistribution command, the following case does not occur: The terminal moves out of the location management area by executing the redistribution command, and notifies the network side of the event by using the signaling message. In this way, network signaling overheads are reduced in the process in which the network side instructs to perform redistribution.

DESCRIPTION OF EMBODIMENTS

A network device in this specification may be a base transceiver station (BTS) in global system for mobile communications (GSM) or code division multiple access (CDMA), or may be a NodeB (NB) in wideband code division multiple access (WCDMA), or may be an evolved NodeB (Evolutional NodeB, eNB or eNodeB) in long term evolution (LTE), a relay node or an access point, a base station in a future 5G network, or the like. No limitation is imposed herein.

A terminal in this specification is a device providing voice and/or data connectivity for a user, and includes a wireless terminal or a wired terminal. The wireless terminal may be a handheld device with a wireless connection function, another processing device connected to a wireless modem, or a mobile terminal that communicates with one or more core networks by using a radio access network. For example, the wireless terminal may be a mobile phone (or referred to as a "cellular" phone) and a computer with a mobile terminal. For another example, the wireless terminal may be a portable, pocket-sized, handheld, computer built-in, or in-vehicle mobile apparatus. For another example, the wireless terminal may be a part of user equipment (UE).

"A plurality of" in this specification means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1A:
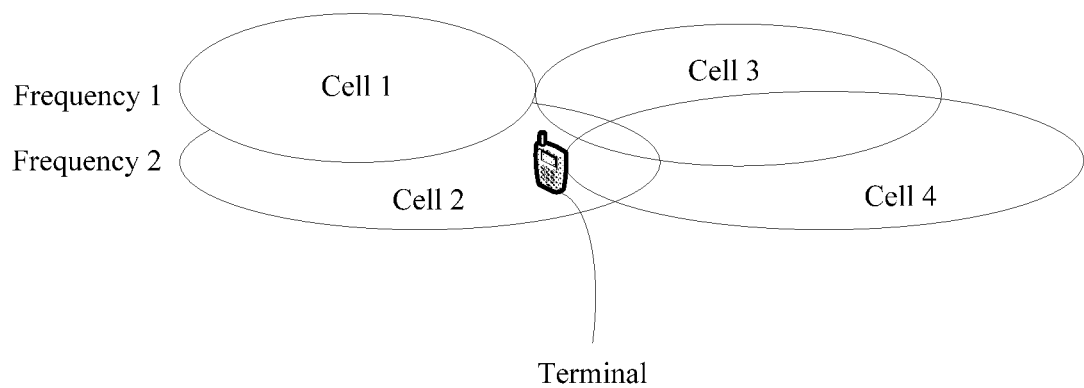
FIG. 1A is a schematic diagram of an application scenario according to an embodiment of this application.
Figure 1B:
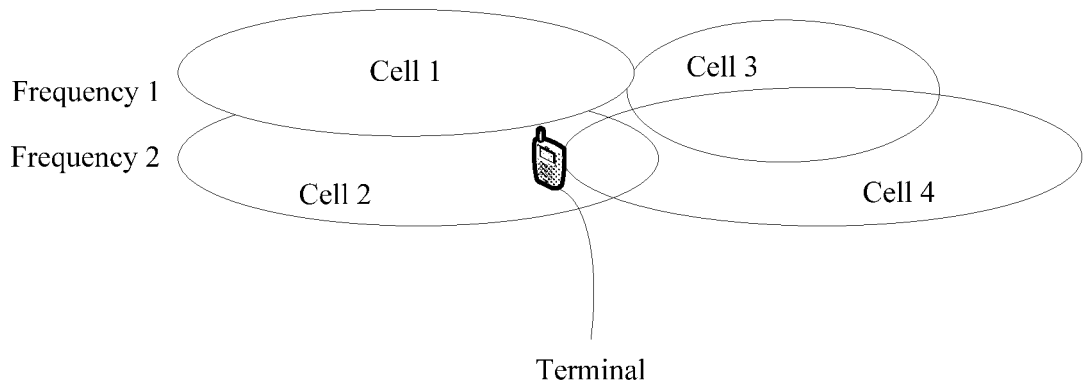
FIG. 1B is a schematic diagram of another application scenario according to an embodiment of this application.

FIG. 1A is a schematic diagram of an application scenario according to an embodiment of this application. FIG. 1B is a schematic diagram of another application scenario according to an embodiment of this application. As shown in FIG. 1A, a network device includes two frequencies and four cells. The two frequencies include a frequency 1 and a frequency 2. The four cells include a cell 1, a cell 2, a cell 3, and a cell 4. A terminal currently camps on the cell 2 of the frequency 2. The terminal is in an inactive state. A location management area of the terminal includes the cell 1 and the cell 2. The terminal can perform an adjustment method in the embodiments of this application, to reduce network signaling overheads in a process in which a network side instructs to perform redistribution. For example, after the terminal receives a redistribution command sent by the network side, the terminal learns that the terminal needs to reselect to the cell 3 of the frequency 1 after the terminal executes the redistribution command. However, the location management area of the terminal does not include the cell 3. In this case, the terminal ignores the redistribution command by implementing the adjustment method in the embodiments of this application, to avoid the following case: The terminal moves out of the location management area of the terminal after executing the redistribution command, and reports the event to the network side by using a signaling message. In this way, network signaling overheads are reduced. In the foregoing application scenario, after implementing the adjustment method in the embodiments of this application, the terminal stays in the cell 2 of the frequency 2.

As shown in FIG. 1B, a network device includes two frequencies and four cells. The two frequencies include a frequency 1 and a frequency 2. The four cells include a cell 1, a cell 2, a cell 3, and a cell 4. A terminal currently camps on the cell 2 of the frequency 2. The terminal is in an inactive state. A location management area of the terminal includes the cell 2. The terminal can perform an adjustment method in the embodiments of this application, to reduce network signaling overheads in a process in which a network side instructs to perform redistribution (Re-distribution). For example, after the terminal receives a redistribution command sent by the network side, the terminal learns that the terminal needs to reselect to the cell 1 of the frequency 1 after the terminal executes the redistribution command. However, the location management area of the terminal does not include the cell 1. In this case, the terminal ignores the redistribution command by implementing the adjustment method in the embodiments of this application, to avoid the following case: The terminal moves out of the location management area of the terminal after executing the redistribution command, and reports the event to the network side by using a signaling message. In this way, network signaling overheads are reduced. In the foregoing application scenario, after implementing the adjustment method in the embodiments of this application, the terminal stays in the cell 2 of the frequency 2.

For a specific implementation of the adjustment method in the embodiments of this application, refer to specific descriptions in the following embodiments.

A connected state in this specification specifically means that a radio resource control (RRC) connection is established between a terminal and a radio access network (RAN) device. When the terminal is in the connected state, the terminal stores context information of the terminal, and can perform cell handover under the control of the RAN.

An idle state in this specification specifically means that no RRC connection exists between a terminal and a RAN device, and the terminal and the RAN device do not store context information of the terminal any longer. When the terminal is in the idle state, the terminal releases the context information of the terminal, and can perform cell-based reselection.

An inactive state in this specification specifically means that a terminal stores context information of the terminal and can perform a cell-based reselection operation, and that connection information of the terminal is stored in an anchor RAN device. The connection information of the terminal includes the context information of the terminal and information about a connection to a core network. A terminal in the inactive state performs cell reselection as the terminal in the idle state. After receiving a redistribution command, the terminal in the inactive state also selects a proper frequency based on the redistribution command. When the terminal is in the inactive state, the terminal stores location management area information configured by the anchor RAN device. When moving out of a location management area corresponding to the location management area information, the terminal needs to notify the anchor RAN device of the event.

It should be noted that the foregoing inactive state is only a name, and the name constitutes no limitation on the state. In a future 5G network and another future network, the inactive state may have another name. This is not specifically limited in the embodiments of this application. For example, the inactive state may also be referred to as a third state, a light connection state, a suspend state, a deactivated state, a low-overhead state, or the like. The location management area may also be referred to as a radio access network paging area, a radio access network notification area, an access network location tracking area, or the like. The following embodiments specifically describe the adjustment method in the embodiments of this application by using the inactive state and the location management area.

Context information in this specification specifically means that after a RAN device establishes an RRC connection to a terminal, the RAN device allocates context information to the terminal, and the RAN device communicates with the terminal based on the context information. The context information may be specifically context information allocated by an anchor RAN device to the terminal.

Figure 2:
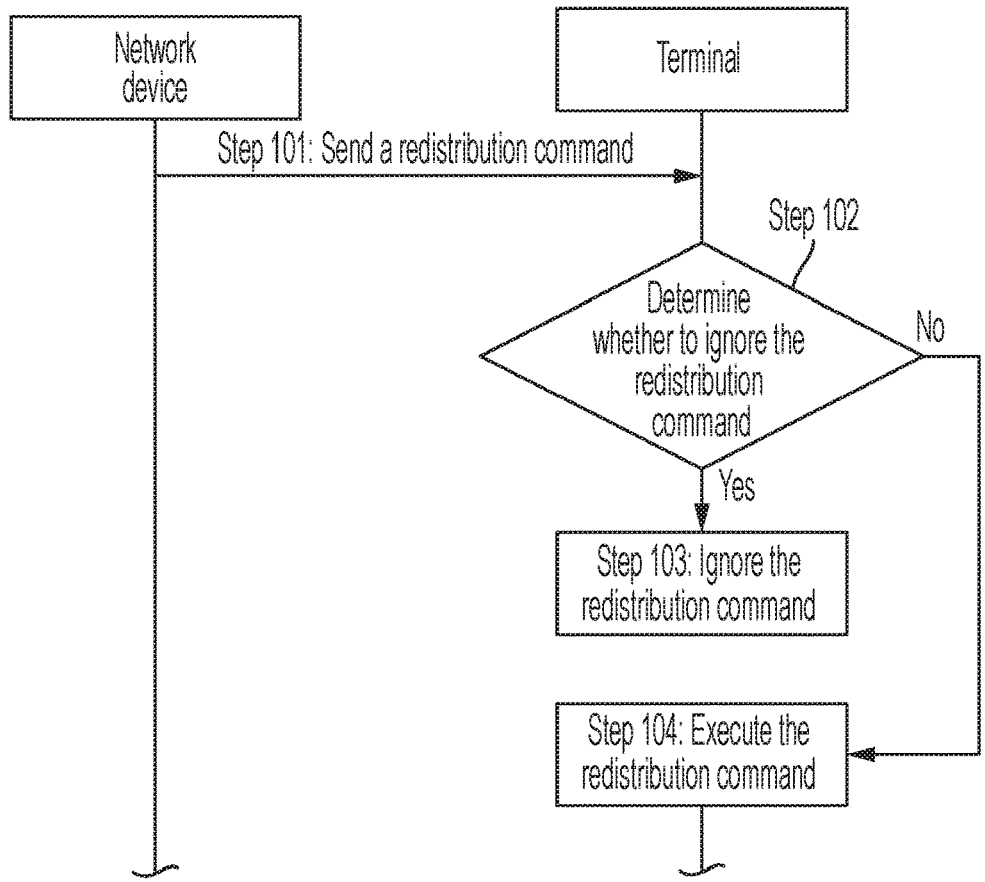
FIG. 2 is a flowchart of an adjustment method according to an embodiment of this application.

FIG. 2 is a flowchart of an adjustment method according to an embodiment of this application. As shown in FIG. 2, the method in this embodiment may include the following steps.

Step 101: A network device sends a redistribution command to a terminal, and the terminal receives the redistribution command sent by the network device, where the redistribution command is used to adjust a frequency priority or a cell priority of a terminal in a cell.

The network device may send the redistribution command to the terminal by using a broadcast message or a paging message. When the network device sends the redistribution command by using the broadcast message, the redistribution command may be used to adjust frequency priorities or cell priorities of terminals in the cell in batches. Alternatively, the redistribution command may be used for UE that meets a specific condition. For example, the redistribution command may be used to instruct UE that is in an inactive state and whose UE ID is in a range A to set a priority of a frequency B to a highest priority. In this case, the UE that is in the inactive state and that receives the redistribution command determines whether the UE is in the range A. If the UE is in the range A, the UE sets the priority of the frequency B to the highest priority. The foregoing specific condition may be flexibly set based on a requirement. This is not limited in this embodiment of this application.

Step 102: The terminal determines, based on a status of the terminal, whether to ignore the redistribution command; and if determining to ignore the redistribution command, performs step 103; or if determining not to ignore the redistribution command, performs step 104.

An implementation of step 102 may be as follows: The terminal determines whether the terminal is in the inactive state, and whether the terminal receives indication information sent by the network device. When the terminal is in the inactive state, and the terminal receives the indication information sent by the network device, the terminal performs step 103 is performed. When the terminal is not in the inactive state, or the terminal does not receive the indication information sent by the network device, the terminal performs step 104. The indication information is used to instruct the terminal to ignore the redistribution command if the terminal receives the redistribution command in the inactive state.

Another implementation of step 102 may be as follows: The terminal determines whether the terminal is in the inactive state. When the terminal is in the inactive state, the terminal determines a size of a location management area of the terminal based on location management area information of the terminal. The terminal determines whether the size of the location management area of the terminal meets a preset condition. If the location management area of the terminal meets the preset condition, the terminal performs step 103; or if the location management area of the terminal does not meet the preset condition, the terminal performs step 104. The preset condition may be that the location management area includes only one cell. It may be understood that another condition may be selected as the preset condition. This is not limited herein.

Still another implementation of step 102 may be as follows: The terminal determines whether the terminal is in the inactive state. When the terminal is in the inactive state, the terminal determines, based on location management area information of the terminal, whether a reselected cell exceeds a location management area corresponding to the location management area information after the terminal performs cell reselection by applying the redistribution command. If the reselected cell exceeds the location management area, the terminal performs step 103; or if the reselected cell does not exceed the location management area, the terminal performs step 104.

Yet another implementation of step 102 may be as follows: The terminal determines whether the terminal is in the inactive state. When the terminal is in the inactive state, the terminal determines, based on location management area information of the terminal, whether a reselected frequency is within a frequency range included in a location management area of the terminal after the terminal performs cell reselection by applying the redistribution command. If the reselected frequency is within the frequency range, the terminal performs step 103; or if the reselected frequency is not within the frequency range, the terminal performs step 104.

Step 103: The terminal ignores the redistribution command.

Step 104: The terminal executes the redistribution command.

In this embodiment, the terminal receives the redistribution command sent by the network device, and the terminal ignores the redistribution command based on the status of the terminal. After the terminal ignores the redistribution command, the following case does not occur: The terminal moves out of the location management area by executing the redistribution command, and notifies a network side of the event by using a signaling message. In this way, network signaling overheads are reduced in a process in which the network side instructs to perform redistribution.

The following uses several specific embodiments to describe in detail the technical solutions of the method embodiment shown in FIG. 2.

Figure 3:
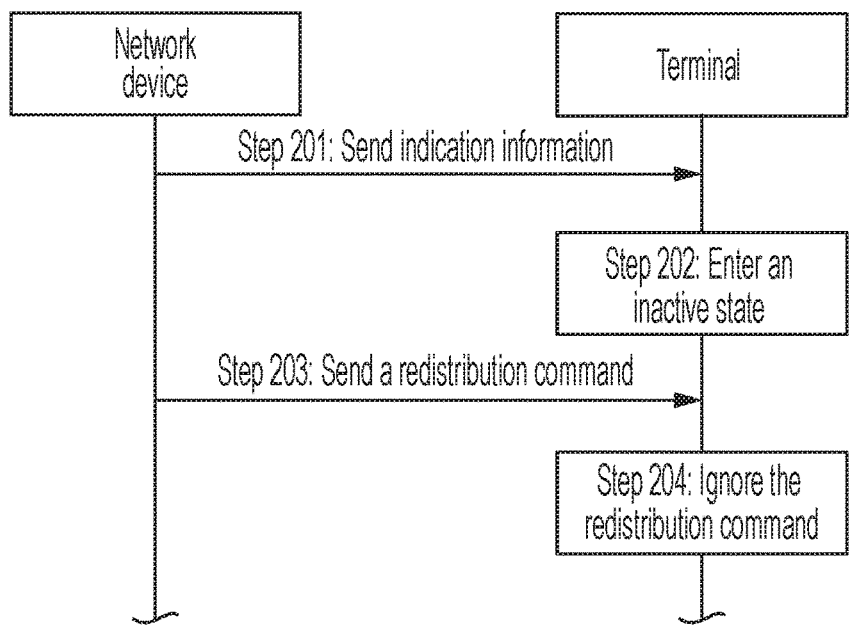
FIG. 3 is a flowchart of another adjustment method according to an embodiment of this application.

FIG. 3 is a flowchart of another adjustment method according to an embodiment of this application. As shown in FIG. 3, the method in this embodiment may include the following steps.

Step 201: A network device sends indication information to a terminal, and the terminal receives the indication information sent by the network device, where the indication information is used to instruct the terminal to ignore a redistribution command if the terminal receives the redistribution command in an inactive state.

Specifically, the indication information may be carried in a dedicated signaling message. The dedicated signaling message may be a status transition control command. The status transition control command is used to instruct the terminal to enter the inactive state. Certainly, the indication information may be carried in another message, to be sent to the terminal. This is not limited in this embodiment of this application.

After receiving the indication information, the terminal may store the indication information, so that when subsequently receiving the redistribution command, the terminal determines whether to apply the redistribution command.

Step 202: The terminal enters the inactive state.

Step 203: The network device sends the redistribution command to the terminal, and the terminal receives the redistribution command sent by the network device.

Step 204: The terminal ignores the redistribution command.

Specifically, when the terminal is in the inactive state, and the terminal receives the indication information sent by the network device, the terminal ignores the redistribution command.

In this embodiment, the network device sends the indication information to the terminal, and instructs, by using the indication information, the terminal to ignore the redistribution command if the terminal receives the redistribution command in the inactive state. After entering the inactive state, the terminal ignores the received redistribution instruction based on the indication information. In this way, network signaling overheads are reduced in a process in which a network side instructs to perform redistribution.

Figure 4:
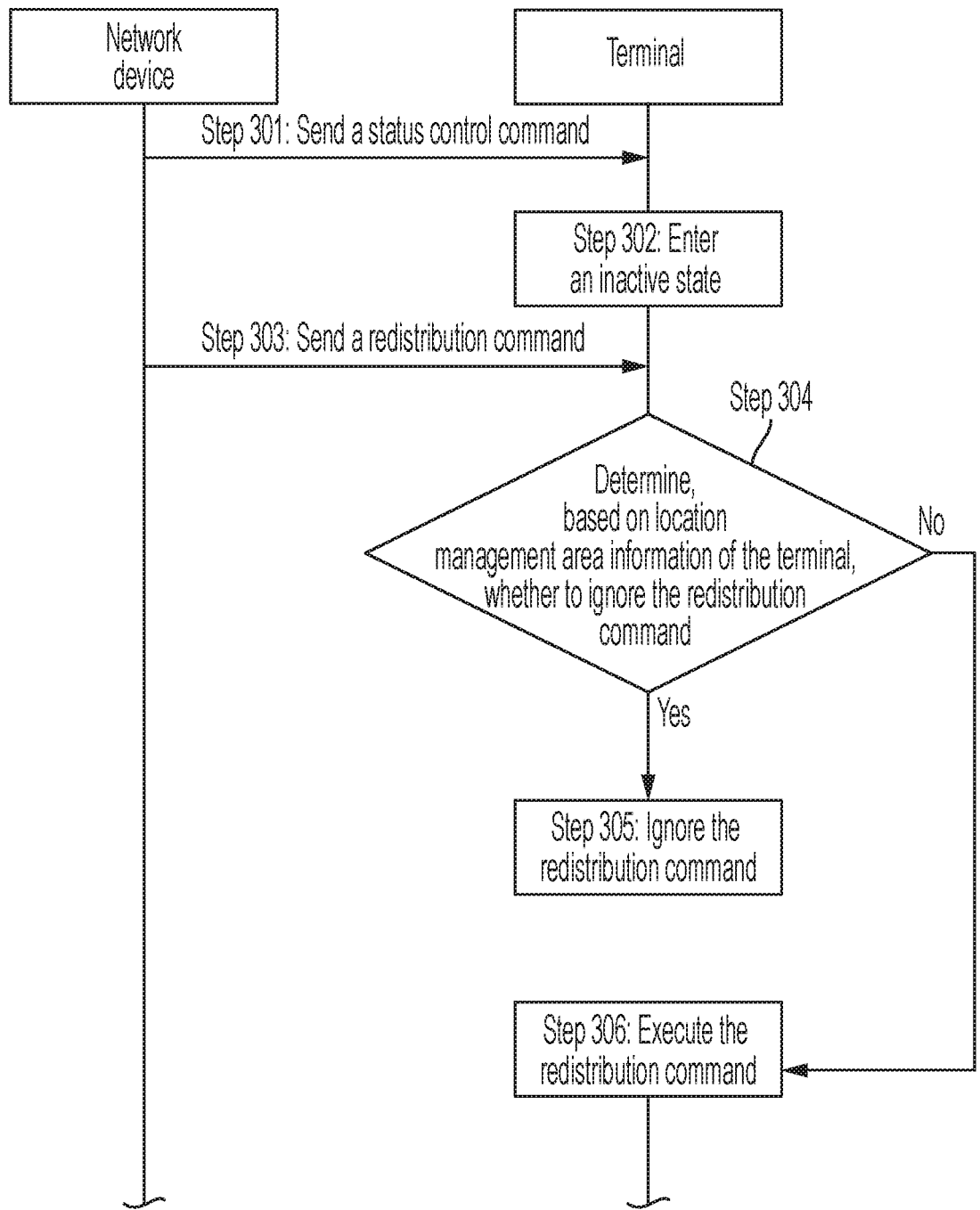
FIG. 4 is a flowchart of still another adjustment method according to an embodiment of this application.

FIG. 4 is a flowchart of still another adjustment method according to an embodiment of this application. As shown in FIG. 4, the method in this embodiment may include the following steps.

Step 301: A network device sends a status control command to a terminal, and the terminal receives the status control command sent by the network device, where the status control command is used to instruct the terminal to enter an inactive state.

The status control command may carry location management area information of the terminal.

Step 302: The terminal enters the inactive state based on the status control command.

Step 303: The network device sends a redistribution command to the terminal, and the terminal receives the redistribution command sent by the network device.

Step 304: The terminal determines, based on the location management area information of the terminal, whether to ignore the redistribution command; and if determining to ignore the redistribution command, performs step 305; or if determining not to ignore the redistribution command, performs step 306.

Specifically, the location management area information may include a cell list, a frequency list, or a management area identifier.

A specific implementation of step 304 may be as follows: The terminal determines a size of a location management area of the terminal based on the location management area information of the terminal, and the terminal ignores the redistribution command based on the size of the location management area. For example, if the location management area of the terminal includes one cell, the terminal ignores the redistribution command. It may be understood that a condition for ignoring the redistribution command may be flexibly set based on a requirement.

Another specific implementation of step 304 may be as follows: The terminal determines, based on the location management area information of the terminal, whether a reselected cell exceeds a location management area corresponding to the location management area information after the terminal performs cell reselection by applying the redistribution command. If the reselected cell exceeds the location management area, the terminal performs step 305; or if the reselected cell does not exceed the location management area, the terminal performs step 306. For example, the application scenario in FIG. 1A is used as an example for further description. The terminal currently camps on the cell 2 of the frequency 2. After receiving the redistribution command, the terminal learns that if the terminal executes the redistribution command, the terminal camps on the cell 3 of the frequency 1. However, the cell 3 is not included in the location management area. Therefore, the terminal ignores the redistribution command. If the cell 3 is included in the location management area, the terminal executes the redistribution command, and camps on the cell 3.

Another specific implementation of step 304 may be as follows: The terminal determines, based on the location management area information of the terminal, whether a reselected frequency is within a frequency range included in a location management area of the terminal after the terminal performs cell reselection by applying the redistribution command. If the reselected frequency exceeds the frequency range, the terminal performs step 305; or if the reselected frequency does not exceed the frequency range, the terminal performs step 306.

Step 305: The terminal ignores the redistribution command.

Step 306: The terminal executes the redistribution command.

In this embodiment, the terminal enters the inactive state based on the status control command, and the terminal determines, based on the location management area information of the terminal, whether to ignore the redistribution command. If determining to ignore the redistribution command, the terminal ignores the redistribution command. In this way, network signaling overheads are reduced in a process in which a network side instructs to perform redistribution.

Figure 5:
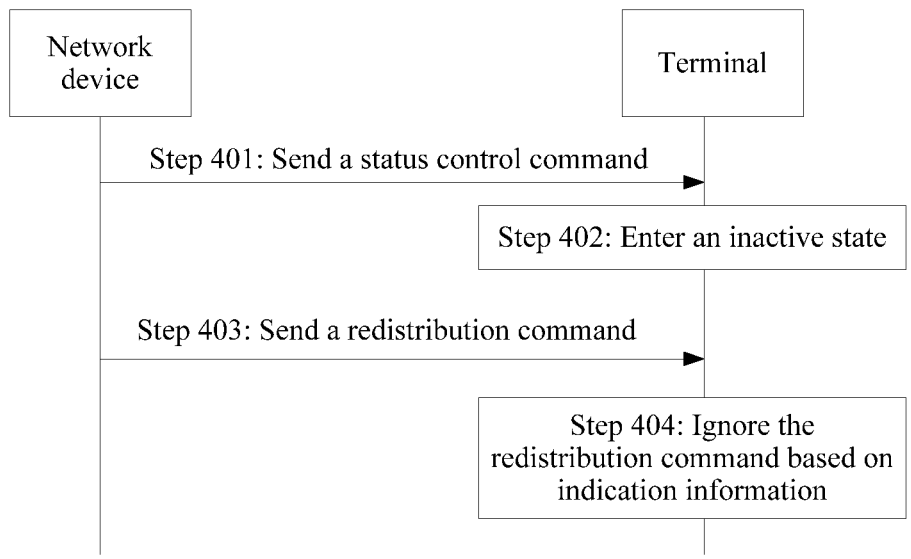
FIG. 5 is a flowchart of yet another adjustment method according to an embodiment of this application.

FIG. 5 is a flowchart of yet another adjustment method according to an embodiment of this application. As shown in FIG. 5, the method in this embodiment may include the following steps.

Step 401: A network device sends a status control command to a terminal, and the terminal receives the status control command sent by the network device, where the status control command is used to instruct the terminal to enter an inactive state.

Step 402: The terminal enters the inactive state.

Step 403: The network device sends a redistribution command to the terminal, and the terminal receives the redistribution command sent by the network device, where the redistribution command carries indication information, and the indication information is used to instruct the terminal to ignore the redistribution command if the terminal receives the redistribution command in the inactive state.

Step 404: The terminal ignores the redistribution command based on the indication information.

In this embodiment, the network device sends the indication information to the terminal by using the redistribution command, and the terminal ignores the redistribution command based on the indication information. In this way, network signaling overheads are reduced in a process in which a network side instructs to perform redistribution.

Figure 6:
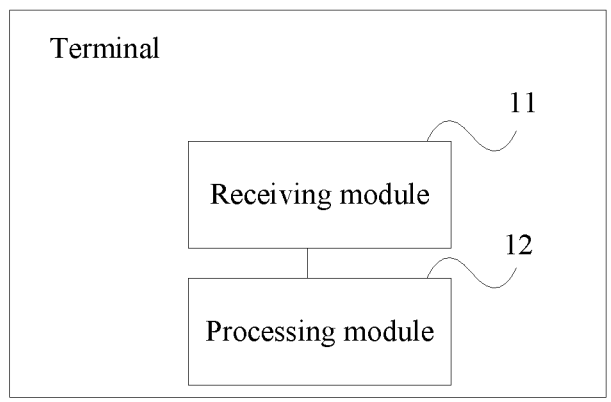
FIG. 6 is a schematic structural diagram of a terminal according to an embodiment of this application.

FIG. 6 is a schematic structural diagram of a terminal according to an embodiment of this application. As shown in FIG. 6, the terminal in this embodiment may include a receiving module 11 and a processing module 12. The receiving module 11 is configured to receive a redistribution command sent by a network device. The redistribution command is used to adjust a frequency priority or a cell priority of a terminal in a cell. The processing module 12 is configured to ignore the redistribution command based on a status of the terminal.

Optionally, the processing module 12 may be specifically configured to: when the terminal is in an inactive state, and the terminal receives indication information sent by the network device, ignore the redistribution command.

Optionally, the receiving module 11 may be specifically configured to: before receiving the redistribution command, receive the indication information from an anchor network device of the terminal; or receive the indication information from a message including the redistribution command.

Optionally, the processing module 12 may be specifically configured to: when the terminal is in an inactive state, ignore the redistribution command based on location management area information of the terminal.

Optionally, the location management area information includes a cell list or a management area identifier, and the processing module 12 may be specifically configured to: determine a size of a location management area of the terminal based on the location management area information of the terminal; and ignore the redistribution command based on the size of the location management area of the terminal.

Optionally, that the processing module 12 is configured to ignore the redistribution command based on the size of the location management area of the terminal includes: ignoring the redistribution command if the location management area of the terminal includes one cell.

Optionally, that the processing module 12 is configured to ignore the redistribution command based on location management area information of the terminal includes: ignoring the redistribution command if the terminal determines, based on the location management area information of the terminal, that a reselected cell exceeds a location management area corresponding to the location management area information after the terminal performs cell reselection by applying the redistribution command.

Optionally, the terminal in this embodiment of this application may further include a storage module, and the storage module is configured to store program code and data of the terminal.

Optionally, the terminal in this embodiment of this application may further include a sending module, and the sending module is configured to send a message, data, and the like.

The terminal in this embodiment may be configured to execute the technical solutions of the foregoing method embodiments. Implementation principles and technical effects thereof are similar to those in the foregoing method embodiments, and details are not described herein again.

Figure 7:
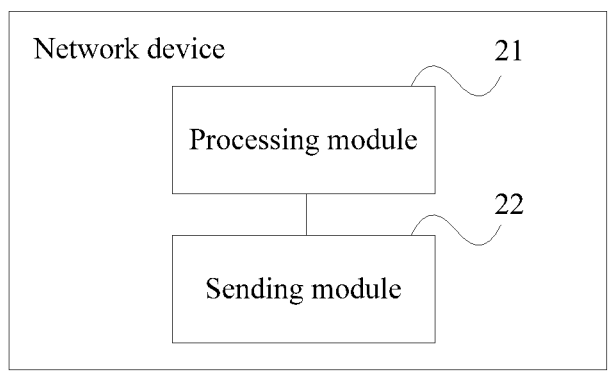
FIG. 7 is a schematic structural diagram of a network device according to an embodiment of this application.

FIG. 7 is a schematic structural diagram of a network device according to an embodiment of this application. As shown in FIG. 7, the network device in this embodiment may include a processing module 21 and a sending module 22. The processing module 21 is configured to generate indication information. The sending module 22 is configured to send the indication information to a terminal. The indication information is used to instruct to ignore a redistribution command if the terminal receives the redistribution command in an inactive state.

Optionally, the sending module 22 may be specifically configured to: send a redistribution command to the terminal, where the redistribution command carries the indication information; or send a status control command to the terminal, where the status control command carries the indication information, and the status control command is used to instruct the terminal to enter the inactive state.

Optionally, the processing module 21 may be specifically configured to: determine a size of a location management area of the terminal based on location management area information of the terminal; and generate the indication information based on the size of the location management area of the terminal, where the location management area information includes a cell list or a management area identifier.

Optionally, that the processing module 21 is configured to generate the indication information based on the size of the location management area of the terminal includes: generating the indication information of the terminal if the location management area of the terminal includes one cell.

Optionally, the network device in this embodiment of this application may further include a storage module, and the storage module is configured to store program code and data of the network device.

Optionally, the network device in this embodiment of this application may further include a receiving module, and the receiving module is configured to receive a message, data, and the like.

The network device in this embodiment may be configured to execute the technical solutions of the foregoing method embodiments. Implementation principles and technical effects thereof are similar to those in the foregoing method embodiments, and details are not described herein again.

It should be noted that the receiving module 11 in the embodiments of this application may correspond to a transmitter of the terminal, or may correspond to a transceiver of the terminal. The terminal may further include a sending module. The sending module may correspond to a receiver of the terminal, or may correspond to the transceiver of the terminal. The processing module 12 may correspond to a processor of the terminal. The processor herein may be a central processing unit (CPU), an application-specific integrated circuit (ASIC), or one or more integrated circuits for implementing the embodiments of this application. The terminal may further include a memory, and the memory is configured to store instruction code. The processor invokes the instruction code in the memory, to control the receiving module 11 in the embodiments of this application to perform the foregoing operations.

It should be noted that the sending module 22 in the embodiments of this application may correspond to a transmitter of the network device, or may correspond to a transceiver of the network device. The network device may further include a receiving module. The receiving module may correspond to a receiver of the network device, or may correspond to the transceiver of the network device. The processing module 21 may correspond to a processor of the network device. The processor herein may be a CPU, an ASIC, or one or more integrated circuits for implementing the embodiments of this application. The network device may further include a memory, and the memory is configured to store instruction code. The processor invokes the instruction code in the memory, to control the sending module 22 in the embodiments of this application to perform the foregoing operations.

An embodiment of this application further provides a communications apparatus, and the communications apparatus may be a terminal or a circuit. The communications apparatus may be configured to perform actions performed by the terminal in the foregoing method embodiments.

Figure 8:
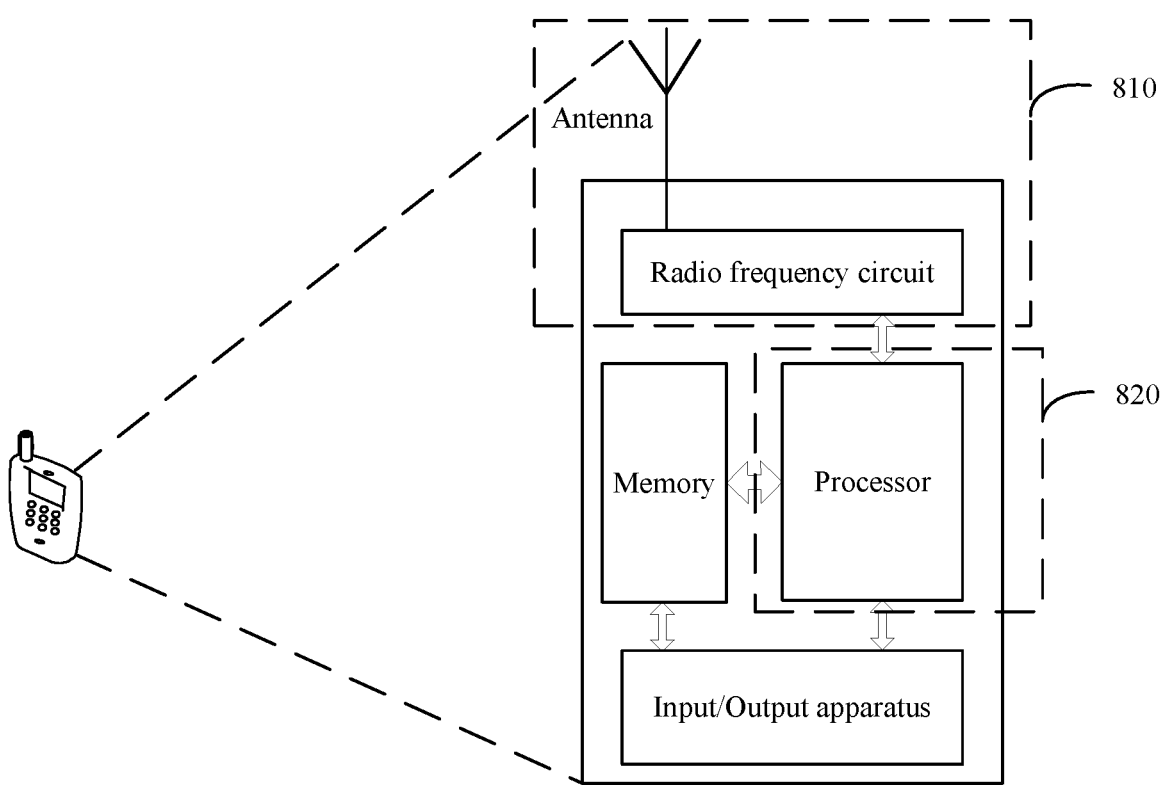
FIG. 8 is a schematic block diagram of a communications apparatus according to an embodiment of this application.

When the communications apparatus is a terminal, FIG. 8 is a schematic structural diagram of a simplified terminal. For ease of understanding and illustration, an example in which the terminal is a mobile phone is used in FIG. 8. As shown in FIG. 8, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store a software program and data. The radio frequency circuit is mainly configured to: perform conversion between a baseband signal and a radio frequency signal, and process a radio frequency signal. The antenna is mainly configured to receive/send a radio frequency signal in an electromagnetic wave form. The input/output apparatus such as a touchscreen, a display screen, or a keyboard is mainly configured to: receive data entered by a user, and output data to the user. It should be noted that some types of terminals may not have an input/output apparatus.

When the processor needs to send data, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 8 shows only one memory and only one processor. In an actual terminal product, one or more processors and one or more memories may exist. The memory may also be referred to as a storage medium, a storage device, or the like. The memory may be disposed independently of the processor, or may be integrated with the processor. This is not limited in this embodiment of this application.

In this embodiment of this application, the antenna and the radio frequency circuit that have a receiving/sending function may be considered as a transceiver unit of the terminal, and the processor that has a processing function may be considered as a processing unit of the terminal. As shown in FIG. 8, the terminal includes a transceiver unit 810 and a processing unit 820. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The transceiver unit sometimes may also be referred to as a transceiver, a transceiver circuit, or the like. The receiving unit sometimes may also be referred to as a receiver, a receiver circuit, or the like. The sending unit sometimes may also be referred to as a transmitter, a transmitter circuit, or the like.

It should be understood that the transceiver unit 810 is configured to perform the sending operation and the receiving operation on the terminal side in the foregoing method embodiments, and the processing unit 820 is configured to perform an operation other than the receiving/sending operation of the terminal in the foregoing method embodiments.

For example, in an implementation, the transceiver unit 810 is configured to perform the receiving operation on the terminal side in step 101 in FIG. 2, and/or the transceiver unit 810 is further configured to perform another receiving/sending step on the terminal side in the embodiments of this application. The processing unit 820 is configured to perform step 102 in FIG. 2, and/or the processing unit 820 is further configured to perform another processing step on the terminal side in the embodiments of this application.

For another example, in another implementation, the transceiver unit 810 is configured to perform the receiving operations on the terminal side in step 201 and step 203 in FIG. 3, and/or the transceiver unit 810 is further configured to perform another receiving/sending step on the terminal side in the embodiments of this application. The processing unit 820 is configured to perform step 202 and step 204 in FIG. 3, and/or the processing unit 820 is further configured to perform another processing step on the terminal side in the embodiments of this application.

For another example, in still another implementation, the transceiver unit 810 is configured to perform the receiving operations on the terminal side in step 301 and step 303 in FIG. 4, and/or the transceiver unit 810 is further configured to perform another receiving/sending step on the terminal side in the embodiments of this application. The processing unit 820 is configured to perform step 302, step 304, step 305, or step 306 in FIG. 4, and/or the processing unit 820 is further configured to perform another processing step on the terminal side in the embodiments of this application.

For another example, in still another implementation, the transceiver unit 810 is configured to perform the receiving operations on the terminal side in step 401 and step 403 in FIG. 5, and/or the transceiver unit 810 is further configured to perform another receiving/sending step on the terminal side in the embodiments of this application. The processing unit 820 is configured to perform step 402 and step 404 in FIG. 5, and/or the processing unit 820 is further configured to perform another processing step on the terminal side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit that is integrated on the chip.

Figure 9:
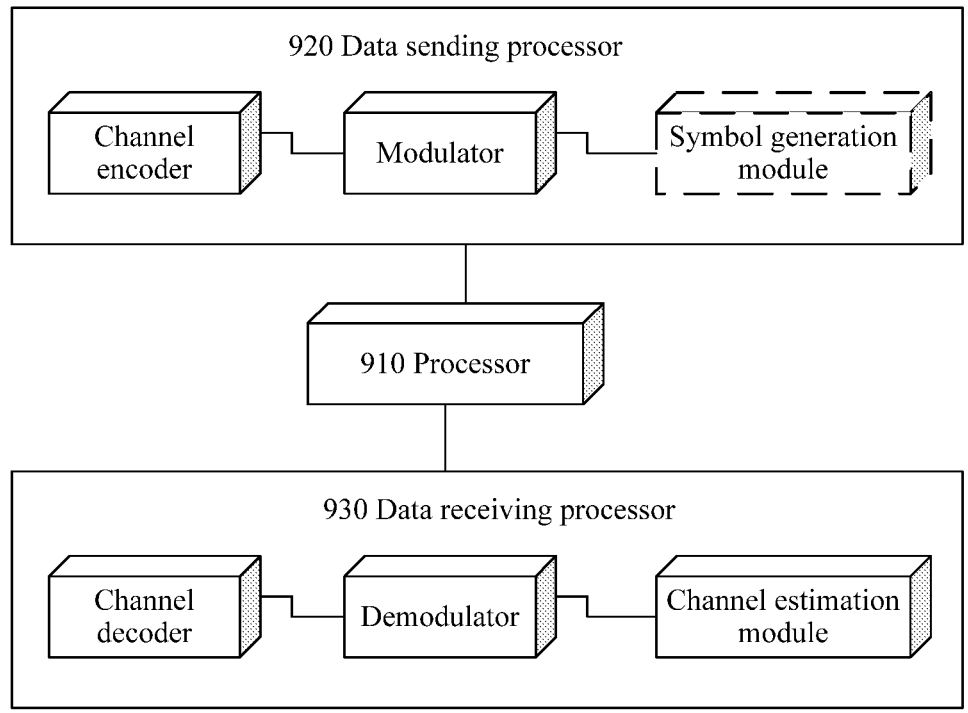
FIG. 9 is another schematic block diagram of a communications apparatus according to an embodiment of this application.

When the communications apparatus in this embodiment is a terminal, reference may be made to a device shown in FIG. 9. For an example, the device can complete a function similar to that of the processor of the foregoing terminal. In FIG. 9, the device includes a processor 910, a data sending processor 920, and a data receiving processor 930. The processing module 12 in the foregoing embodiment may be the processor 910 in FIG. 9, and completes a corresponding function. The receiving module 11 in the foregoing embodiment may be the data receiving processor 930 in FIG. 9. The sending module in the foregoing embodiment may be the data sending processor 920 in FIG. 9. Although FIG. 9 shows a channel encoder and a channel decoder, it may be understood that these modules are merely examples, and do not constitute a limitation on this embodiment.

Figure 10:
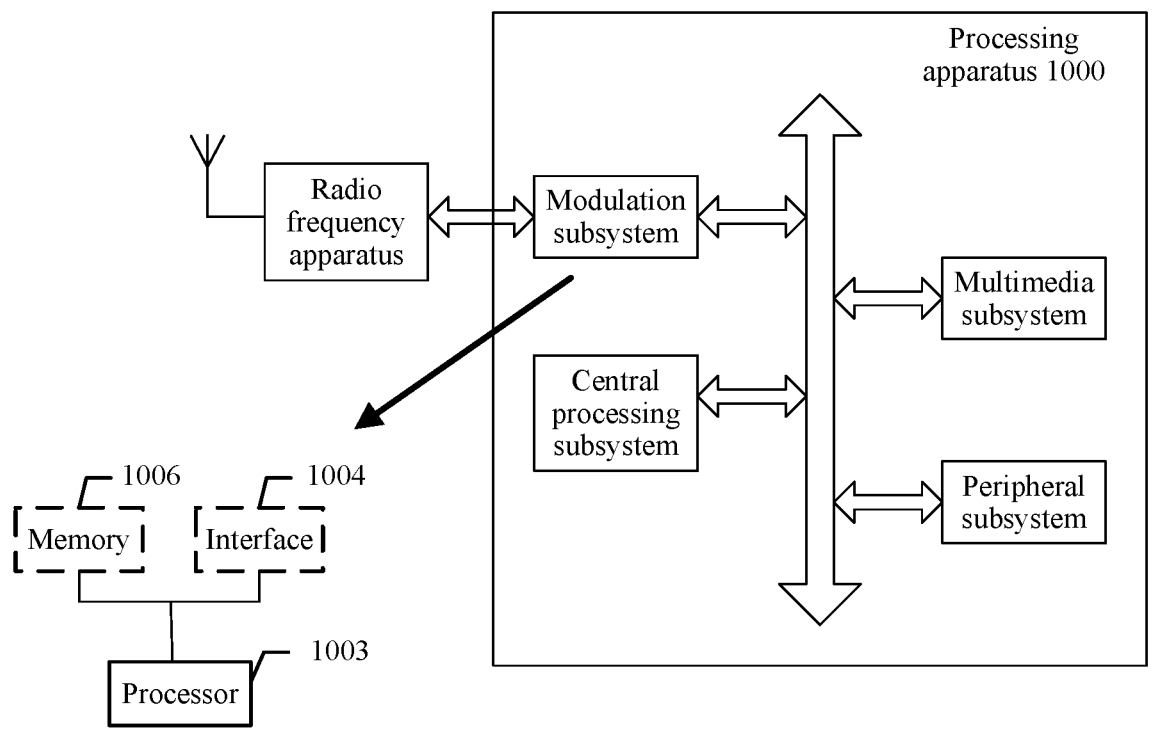
FIG. 10 is still another schematic block diagram of a communications apparatus according to an embodiment of this application.

FIG. 10 shows another form of this embodiment. A processing apparatus 1000 includes modules such as a modulation subsystem, a central processing subsystem, and a peripheral subsystem. The communications apparatus in this embodiment may be used as the modulation subsystem in the processing apparatus 1000. Specifically, the modulation subsystem may include a processor 1003 and an interface 1004. The processor 1003 completes the function of the processing module 12. The interface 1004 completes the functions of the receiving module and the sending module. In another variant, the modulation subsystem includes a memory 1006, a processor 1003, and a program that is stored in the memory 1006 and that can be run on the processor. When executing the program, the processor 1003 implements the method on the terminal side in the foregoing method embodiments. It should be noted that the memory 1006 may be non-volatile or volatile. The memory 1006 may be located in the modulation subsystem, or may be located in the processing apparatus 1000, provided that the memory 1006 can be connected to the processor 1003.

In another form of this embodiment, a computer readable storage medium is provided. The computer readable storage medium stores an instruction. When the instruction is executed, the method on the terminal side in the foregoing method embodiments is performed.

In another form of this embodiment, a computer program product that includes an instruction is provided. When the instruction is executed, the method on the terminal side in the foregoing method embodiments is performed.

An embodiment of this application further provides a communications apparatus, and the communications apparatus may be a network device or a circuit. The communications apparatus may be configured to perform actions performed by the network device in the foregoing method embodiments.

Figure 11:
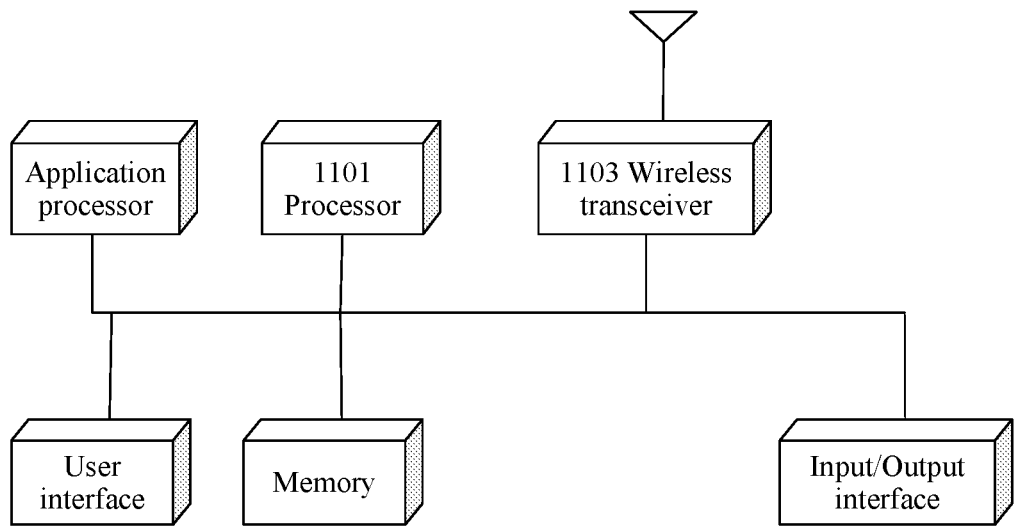
FIG. 11 is still another schematic block diagram of a communications apparatus according to an embodiment of this application.

When the communications apparatus in this embodiment is a network device, reference may be made to a device shown in FIG. 11. The device includes a processor 1101, an application processor, a memory, a user interface, and some other elements (including a device such as a power supply that is not shown). In FIG. 11, the processing module 21 may be the processor 1101, and completes a corresponding function. The sending module 22 and/or the receiving module may be a wireless transceiver 1103 in the figure. The wireless transceiver 1103 completes a corresponding function by using an antenna. It may be understood that the elements shown in the figure are merely examples, and are not necessary elements for completing this embodiment.

Figure 12:
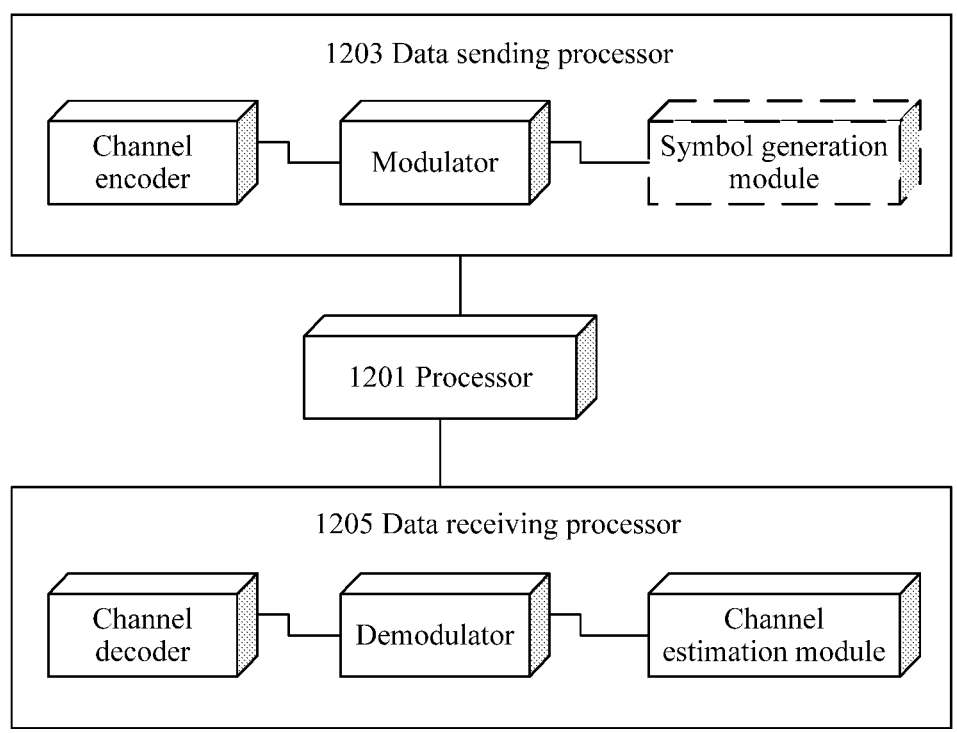
FIG. 12 is still another schematic block diagram of a communications apparatus according to an embodiment of this application.

When the communications apparatus in this embodiment is a network device, reference may be made to a device shown in FIG. 12. For an example, the device can complete a function similar to that of the processor in FIG. 11. In FIG. 12, the device includes a processor 1201, a data sending processor 1203, and a data receiving processor 1205. In FIG. 12, the processing module 21 may be the processor 1201, and completes a corresponding function. The sending module 22 may be the data sending processor 1203 in FIG. 12. The receiving module may be the data receiving processor 1205 in FIG. 12. Although the figure shows a channel encoder and a channel decoder, it may be understood that these modules are merely examples, and do not constitute a limitation on this embodiment.

Figure 13:
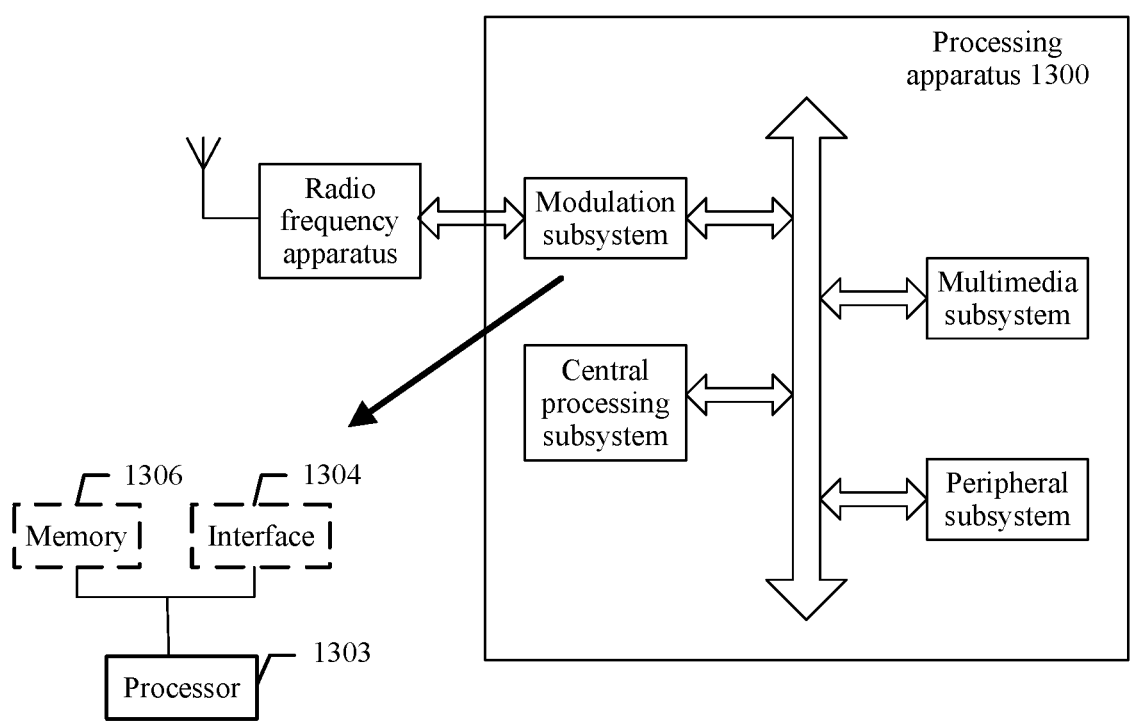
FIG. 13 is still another schematic block diagram of a communications apparatus according to an embodiment of this application.

FIG. 13 shows another form of this embodiment. A processing apparatus 1300 includes modules such as a modulation subsystem, a central processing subsystem, and a peripheral subsystem. The communications apparatus in this embodiment may be used as the modulation subsystem in the processing apparatus 1300. Specifically, the modulation subsystem may include a processor 1303 and an interface 1304. The processor 1303 completes the function of the processing module 21. The interface 1304 completes the functions of the sending module and/or the receiving module. In another variant, the modulation subsystem includes a memory 1306, a processor 1303, and a program that is stored in the memory and that can be run on the processor. When executing the program, the processor implements the method in any one of the method embodiments. It should be noted that the memory 1306 may be non-volatile or volatile. The memory 1306 may be located in the modulation subsystem, or may be located in the processing apparatus 1300, provided that the memory 1306 can be connected to the processor 1303.

In another form of this embodiment, a computer readable storage medium is provided. The computer readable storage medium stores an instruction. When the instruction is executed, the method on the network device side in the foregoing method embodiments is performed.

In another form of this embodiment, a computer program product that includes an instruction is provided. When the instruction is executed, the method on the network device side in the foregoing method embodiments is performed.

Persons of ordinary skill in the art may understand that all or some of the steps of the method embodiments may be implemented by a program instructing related hardware. The program may be stored in a computer readable storage medium. When the program is executed, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An adjustment method, comprising:
    receiving, by a communications device, a redistribution command sent by a network device, wherein the redistribution command is used to adjust a frequency priority or a cell priority of a communications device in a cell; and
    ignoring, by the communications device, the redistribution command when the communications device is in an inactive state, wherein a status of the communications device includes a connected state, an idle state, and the inactive state, the inactive state being different from the connected state and the idle state.

2. The method according to claim 1, wherein the ignoring, by the communications device, the redistribution command comprises:
    when the communications device is in the inactive state, and the communications device receives indication information sent by the network device, ignoring, by the communications device, the redistribution command.

3. The method according to claim 2, wherein receiving, by the communications device, the indication information sent by the network device comprises:
    before receiving the redistribution command, receiving, by the communications device, the indication information from an anchor network device of the communications device; or
    receiving, by the communications device, the indication information from a message comprising the redistribution command.

4. The method according to claim 1, wherein the ignoring, by the communications device, the redistribution command when the communications device is in the inactive state comprises:
    ignoring, by the communications device, the redistribution command based on location management area information of the communications device.

5. The method according to claim 4, wherein the location management area information comprises a cell list or a management area identifier, and the ignoring, by the communications device, the redistribution command based on location management area information of the communications device comprises:
    determining, by the communications device, a size of a location management area of the communications device based on the location management area information of the communications device; and
    ignoring, by the communications device, the redistribution command based on the size of the location management area of the communications device.

6. The method according to claim 5, wherein the ignoring, by the communications device, the redistribution command based on the size of the location management area of the communications device comprises:
    ignoring, by the communications device, the redistribution command with the location management area of the communications device including only one cell.

7. The method according to claim 4, wherein the ignoring, by the communications device, the redistribution command based on location management area information of the communications device comprises:
    ignoring, by the communications device, the redistribution command with the communications device determining, based on the location management area information of the communications device, that a reselected cell exceeds a location management area corresponding to the location management area information after the communications device performs cell reselection by applying the redistribution command; or ignoring, by the communications device, the redistribution command if the communications device determines, based on the location management area information of the communications device, that a reselected frequency exceeds a frequency range corresponding to the location management area information after the communications device performs cell reselection by applying the redistribution command.

8. The method according to claim 1, wherein when the communications device is in the inactive state, the communications device stores context information and location management area information, the context information being allocated to the communications device by an anchor network device of the communications device, the location management area information being configured by the anchor network device, and the communications device notifies the anchor network device when the communications device moves out of a location management area corresponding to the location management area information.

9. A communications device, comprising:
a receiver, configured to receive a redistribution command sent by a network device, wherein the redistribution command is used to adjust a frequency priority or a cell priority of a communications device in a cell; and
a processor, configured to ignore the redistribution command when the communications device is in an inactive state, wherein a status of the communications device includes a connected state, an idle state, and the inactive state, the inactive state being different from the connected state and the idle state.

10. The communications device according to claim 9, wherein the processor is further configured to ignore the redistribution command when the communications device is in the inactive state and the communications device receives indication information sent by the network device.

11. The communications device according to claim 10, wherein the receiver is further configured to:
before receiving the redistribution command, receive the indication information from an anchor network device of the communications device; or
receive the indication information from a message comprising the redistribution command.

12. The communications device according to claim 9, wherein the processor is further configured to ignore the redistribution command when the communications device is in the inactive state based on location management area information of the communications device.

13. The communications device according to claim 12, wherein the location management area information comprises a cell list or a management area identifier, and the processor is further configured to:
determine a size of a location management area of the communications device based on the location management area information of the communications device; and
ignore the redistribution command based on the size of the location management area of the communications device.

14. The communications device according to claim 13, wherein the processor is further configured to ignore the redistribution command with the location management area of the communications device including only one cell.

15. The communications device according to claim 12, wherein the processor is further configured to ignore the redistribution command with the communications device determining, based on the location management area information of the communications device, that a reselected cell exceeds a location management area corresponding to the location management area information after the communications device performs cell reselection by applying the redistribution command.

16. The communications device according to claim 9, wherein when the communications device is in the inactive state, the processor is further configured to:
store context information and location management area information, the context information being allocated to the communications device by an anchor network device of the communications device, the location management area information being configured by the anchor network device; and
notify the anchor network device when the communications device moves out of a location management area corresponding to the location management area information.

17. A network device, comprising:
a processor, configured to generate indication information; and
a transmitter, configured to send the indication information to a communications device, wherein the indication information is used to instruct the communications device to ignore a redistribution command when the communications device receives the redistribution command in an inactive state, wherein a status of the communications device includes a connected state, an idle state, and the inactive state, the inactive state being different from the connected state and the idle state.

18. The network device according to claim 17, wherein the transmitter is further configured to:
send a redistribution command to the communications device, wherein the redistribution command carries the indication information; or
send a status control command to the communications device, wherein the status control command carries the indication information, and the status control command is used to instruct the communications device to enter the inactive state.

19. The network device according to claim 17, wherein the processor is further configured to:
determine a size of a location management area of the communications device based on location management area information of the communications device; and
generate the indication information based on the size of the location management area of the communications device, wherein the location management area information comprises a cell list or a management area identifier.

20. The network device according to claim 19, wherein the processor is further configured to generate the indication information of the communications device with the location management area of the communications device including only one cell.

* * * * *

UNITED STATES PATENT AND TRADEMARK OFFICE
CERTIFICATE OF CORRECTION

PATENT NO. : 11,252,594 B2
APPLICATION NO. : 16/712292
DATED : February 15, 2022
INVENTOR(S) : Li et al.

It is certified that error appears in the above-identified patent and that said Letters Patent is hereby corrected as shown below:

On the Title Page

Change:
Item (72) Inventors: "Bingzhao Li, Beijing (CN); Zhenzhen Cao, Beijing (CN); Xuelong Wang, Shenzhen (CN)"

To be:
--Bingzhao Li, Shenzhen (CN); Zhenzhen Cao, Shenzhen (CN); Xuelong Wang, Shenzhen (CN)--

Signed and Sealed this
Third Day of May, 2022

Katherine Kelly Vidal
*Director of the United States Patent and Trademark Office*